UNITED STATES PATENT OFFICE.

LOUIS M. DENNIS, OF ITHACA, NEW YORK.

METHOD OF SULFONATION OF HYDROCARBONS OF THE AROMATIC SERIES.

1,332,203.  Specification of Letters Patent.  Patented Mar. 2, 1920.

No Drawing.  Application filed July 6, 1917. Serial No. 178,976.

*To all whom it may concern:*

Be it known that I, LOUIS M. DENNIS, a citizen of the United States of America, residing at the city of Ithaca, county of Tompkins, State of New York, have invented a new and useful Method of Sulfonation of Hydrocarbons of the Aromatic Series, of which the following is a specification.

My invention relates to a method of sulfonation of hydrocarbons of the aromatic series. I shall illustrate my invention by describing a method of making naphthalene beta-sulfonic acid, although the invention in its broad aspects is not restricted to the making of this particular sulfonic acid.

In the production of naphthalene beta-sulfonic acid, for example, it is customary either to heat a mixture of naphthalene and concentrated sulfuric acid together for about eight hours at temperatures ranging from 160° C. to 185° C., or to heat a mixture of naphthalene with twice the theoretical amount of concentrated sulfuric acid for a much shorter time, say for from about fifteen to thirty minutes, at a temperature of 160° C. Either of these processess causes the simultaneous formation of large amounts of either sulfones, naphthalene di-sulfonic acids or naphthalene alpha-sulfonic acid, or mixtures of two or more or them. Moreover, prolonged heating with sulfuric acid at high temperatures causes the formation of a gum like carbonaceous residue. It has been discovered that in the method of sulfonating naphthalene by heating the substance with twice the theoretical amount of concentrated sulfuric acid for from about fifteen to thirty minutes at 160° C., relatively slight variations in the period of heating result in a marked increase in the formation of naphthalene alpha-sulfonic acid, which is a distinct drawback where naphthalene beta-sulfonic acid is the product desired. For example, if naphthalene is sulfonated by the method last above described, and the duration of heating is about twenty-four minutes the product will contain about thirty-three per cent. of naphthalene alpha-sulfonic acid; if the duration of heating is only about fifteen minutes the product will contain about thirty-eight per cent. of the alpha acid; if the heating is prolonged beyond twenty-four minutes the per cent. of alpha acid in the product rapidly rises, amounting to about forty per cent. at the end of forty-five minutes and over fifty per cent. at the end of about seventy-five minutes.

I have discovered that if naphthalene is sulfonated with sulfuric acid of a suitable dilution instead of with a stronger sulfuric acid, such as concentrated sulfuric acid or fuming sulfuric acid, for example with a seventy-five per cent. sulfuric acid, the production of naphthalene beta-sulfonic acid in the product is higher than in the processes hereinabove described.

Furthermore, if the sulfonation with this more dilute acid is carried on at a temperature of about 160° C., for a period of from one hour to one and three quarters hours the per cent. of naphthalene alpha-sulfonic acid in the product will be much lower than in the processes hitherto employed and will lie between twenty-two and a half and twenty-six per cent.

Again, when the sulfonation is thus conducted there is but very slight formation of sulfones, naphthalene di-sulfonic acids or the gum-like insoluble carbonaceous residue above mentioned. The wide latitude in the length of heating from one hour to one and three quarters hours also renders the process more easy to control. Another marked advantage possessed by the method of sulfonation with the dilute sulfuric acid is that the relative amounts of the alpha and beta-sulfonic acids in the product are quite constant in a series of sulfonations, whereas with the other method the amount of alpha-acid varied five per cent. or more.

When the sulfonation product of this new process is extracted with toluene, as described in my U. S. Letters Patent No. 1,228,414, dated June 5, 1917, the first portions of the toluene, when cooled to about 27° C., deposit naphthalene beta-sulfonic acid free from the alpha-acid. This constitutes a most effective method of obtaining the beta-acid free from the alpha-acid.

It is obvious that there may be variations in concentrations, times of treatment and temperatures without departing from the spirit of the invention and I do not restrict myself to any of the details given further than the scope of the appended claims demands.

What I claim is:

1. A method of sulfonating naphthalene and of separating naphthalene beta-sulfonic acid from the sulfonated product consisting in treating the naphthalene with about 75% sulfuric acid, extracting the beta-acid from the mixture and cooling the extraction.

2. A method of sulfonating naphthalene and separating naphthalene beta-sulfonic acid from the sulfonated product consisting in treating the naphthalene with about 75% sulfuric acid, extracting the beta-acid from the mixture with toluene and cooling the extraction.

3. A method of sulfonating naphthalene and of separating naphthalene beta-sulfonic acid from the sulfonated product consisting in treating the naphthalene with about seventy-five per cent. sulfuric acid at a temperature of about 160° C. for from about an hour to an hour and three quarters, extracting the beta-acid from the mixture with toluene and cooling the extraction.

In testimony whereof I have signed this specification.

LOUIS M. DENNIS.